(12) United States Patent
Hunt et al.

(10) Patent No.: US 11,519,214 B2
(45) Date of Patent: Dec. 6, 2022

(54) POSITIONING UNIT FOR TECHNICAL APPLICATIONS IN MOTOR VEHICLES

(71) Applicant: Kiekert AG, Heiligenhaus (DE)

(72) Inventors: Robert J. Hunt, Davisburg, MI (US); Robert L. Brickner, Berkley, MI (US)

(73) Assignee: Kiekert AG, Heiligenhaus (DE)

( * ) Notice: Subject to any disclaimer, the term of this patent is extended or adjusted under 35 U.S.C. 154(b) by 691 days.

(21) Appl. No.: 16/505,761

(22) Filed: Jul. 9, 2019

(65) Prior Publication Data

US 2021/0010313 A1    Jan. 14, 2021

(51) Int. Cl.
| | |
|---|---|
| *E05F 15/635* | (2015.01) |
| *E05F 15/655* | (2015.01) |
| *E05B 81/30* | (2014.01) |
| *F16H 57/021* | (2012.01) |
| *F16H 57/039* | (2012.01) |

(52) U.S. Cl.
CPC ........... *E05F 15/635* (2015.01); *E05B 81/30* (2013.01); *E05F 15/655* (2015.01); *F16H 57/021* (2013.01); *F16H 57/039* (2013.01); *E05Y 2900/531* (2013.01); *F16H 2057/0213* (2013.01)

(58) Field of Classification Search
CPC ......... E05F 15/00; E05F 15/60; E05F 15/603; E05F 15/605; E05F 15/608; E05F 15/632; E05F 15/655; E05F 81/00; E05F 81/24; E05F 81/25; E05F 81/30; F16H 57/00; F16H 57/02; F16H 57/021; F16H 57/0213; F16H 57/0216; F16H 57/022; F16H 57/0221; F16H 57/0222; F16H 57/039; E05Y 2900/00; E05Y 2900/50; E05Y 2900/532
USPC .......................................................... 292/25
See application file for complete search history.

(56) References Cited

U.S. PATENT DOCUMENTS

| | | | | |
|---|---|---|---|---|
| 5,794,480 | A * | 8/1998 | Schonsteiner | H02K 7/081 74/427 |
| 5,988,614 | A * | 11/1999 | Sturmon | B60G 7/02 267/293 |
| 9,541,156 | B2 * | 1/2017 | Blumenthal | E05B 81/25 |
| 2016/0222701 | A1 * | 8/2016 | Goldmann | F16H 1/16 |

FOREIGN PATENT DOCUMENTS

| | | |
|---|---|---|
| DE | 102009036835 A1 | 2/2011 |
| DE | 102011107634 A1 | 1/2013 |
| DE | 102013012732 A1 | 2/2015 |

\* cited by examiner

*Primary Examiner* — Nathan Cumar
(74) *Attorney, Agent, or Firm* — Renner, Otto, Boisselle & Sklar, LLP

(57) ABSTRACT

A positioning unit for technical applications in motor vehicles, in particular a locking system, a door positioner or a sliding door drive, having a housing, a drive arranged in the housing, a control element which can be acted upon by the drive, and a bearing location for the drive, in which the bearing location is formed at least partly of plastic, wherein the bearing is designed as a separate bearing location, and at least part of the drive is insertable into the bearing location.

15 Claims, 2 Drawing Sheets

POSITIONING UNIT FOR TECHNICAL APPLICATIONS IN MOTOR VEHICLES

Figure 1:
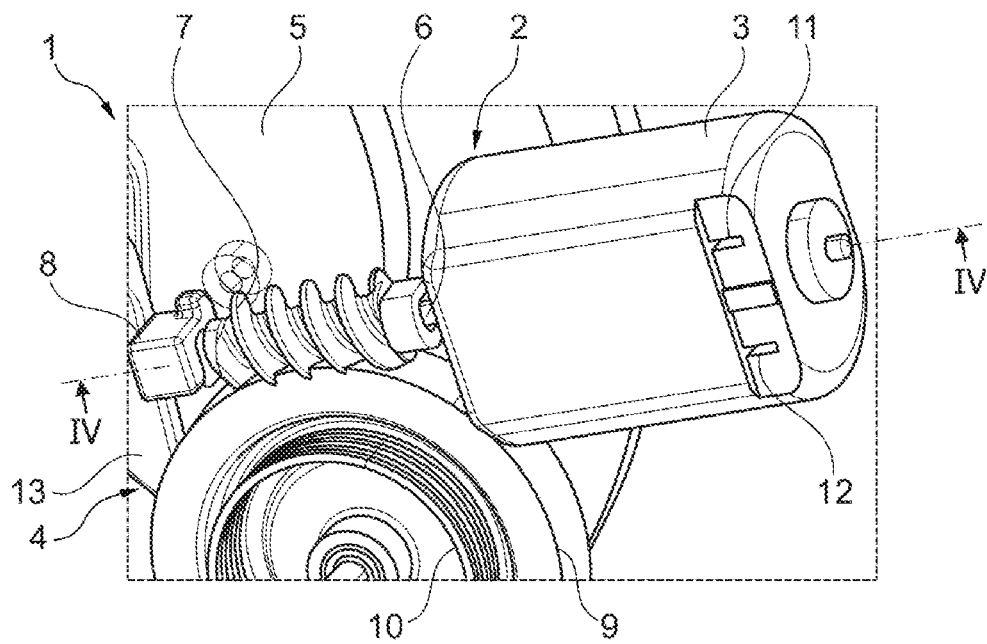

The invention relates to a positioning unit for technical applications in motor vehicles, in particular, a locking system, a door positioner or a sliding door drive, having a plastic housing, a drive arranged in the housing, in particular, a worm drive, a control element which can be acted upon by the drive and a bearing location for the drive formed at least partly of plastic.

More and more electrically assisted operating functions are being used in today's motor vehicles. For example, electric drives for sliding doors or tailgates are used, but also closing aids that transfer a door or tailgate from a pre-ratchet position into a main ratchet position, i.e. into a closed position. To close a door, electric drives are used, which are either installed as separate modules in a side door, for example or locking systems are known in which an electric drive is integrated. Electric drives are also installed in the motor vehicle, for example, to transfer a sliding door from a closing position to an opening position and vice versa.

High demands are made on these drives, wherein a long service life is required, the drives must be designed to be extremely small and cost-effective, and at the same time, high forces must be transmitted. In addition, the noise behavior of the drives plays a major role, since it influences the comfort behavior of the motor vehicle. In order to meet these requirements, various state of the art solutions have become known.

DE 10 2009 036 835 A1 has become known as a positioning unit in the form of a closing aid for a motor vehicle, with a drive and with a linear control element acted upon by the drive, wherein the drive and the linear control element are arranged at an angle to each other. In order to improve the overall noise level of the positioning unit, it is proposed, among other measures, that the bearing location for the drive motor be designed as a rubber bearing seat, wherein the drive is incorporated wholly or partially into a rubber ring. In fact, the rubber ring is pot-shaped and accommodates a bottom of the drive.

In DE 10 2011 107 634 A1 the rubber bearing seat is defined more precisely according to DE 10 2009 036 835 A1. This is a cylindrical rubber bearing which is installed in the housing in a torsion-proof manner with accommodation projections and essentially serves to radially secure the position. In fact, at this point, the control element of the drive is designed as a linear control element, in particular as a spindle drive, and is used to apply pressure to a closing device.

The generic state of the art is disclosed in DE 10 2013 012 732 A1. The published specification discloses a positioning unit for technical applications in motor vehicles, in particular motor vehicle closures or locks, having a plastic housing, having a drive arranged in the housing, in particular a worm drive, having a control element which can be acted upon by the drive, and having at least one slide bearing for accommodating the bearing location of the drive, in particular a worm of the worm drive, wherein the slide bearing additionally at least partly comprises a plastic casing. An electric drive carries a worm of a worm transmission, wherein the worm is held at the end in a slide bearing. The slide bearing in turn is located in a bearing seat of the housing. In order to improve the noise behavior and to counteract wear, the slide bearing has an elastomer coating on its lateral surface. The worm end is accommodated in the bearing seat by means of the elastomer casing.

The solutions known from the state of the art are generally in need of improvement. For example, plastic-cased slide bearings are expensive to manufacture, especially if the slide bearing is only to have a plastic coating in certain areas. In addition, the bearing of the drive in the housing by means of a plastic ring and pressing into squeezing ribs is only conditionally suitable for eliminating tolerances in the manufacture of the plastic housing and ultimately for ensuring that the transmission parameters can be adjusted with as little tolerance as possible. This is where the invention comes into play.

The object of the invention is to provide an improved positioning unit for technical applications in motor vehicles. In particular, it is the object of the invention to provide a bearing of a drive for a positioning unit which is characterized by a long service life and low noise emission. In addition, the bearing should compensate for manufacturing tolerances and provide a simple and design-friendly solution.

The object is achieved by the features of the independent claim 1. Advantageous forms of the invention are indicated in the subclaims. It should be noted that the exemplary embodiment described below is not restrictive; rather, any variation of the characteristics described in the description and subclaims is possible.

According to claim 1, the object of the invention is solved by a positioning unit for technical applications in motor vehicles, in particular a locking system, a door positioner or a sliding door drive, having a housing, in particular a plastic housing, a drive arranged in the housing, in particular a worm drive, a control element which can be acted upon by the drive, and a bearing location for the drive formed at least partly of plastic, wherein the bearing is formed as a separate bearing location and at least part of the drive can be introduced into the bearing location. The structure, according to the invention, of the positioning unit now makes it possible to specifically influence the bearings of the drive and in particular of a worm drive. By forming a separate plastic component as a bearing means for the drive, a tolerance compensation can be carried out with the simplest design means, which also has a damping effect. On the one hand, manufacturing tolerances in the manufacture, in particular in the injection molding of housing parts, can be compensated and on the other hand, the damping effect of the plastic bearings can be used to reduce or eliminate noise emissions. The possibility of introducing or inserting at least a part of the drive into the bearing location represents a simple and cost-effective way of achieving the benefits according to the invention.

In the sense of the invention, electric drives, such as for a sliding door, a tailgate or, for example, a door lock, can be regarded as positioning units. This is the case wherever electrically assisted positioning movements are used by means of a drive and, in particular, a worm drive. By means of the drive, a control element is operated, wherein the control element can, for example, be a Bowden cable, a cable pull or a lever of a kinematic system connected downstream of the drive.

The drive is preferably an electric motor mounted in the housing of the positioning unit. At the output shaft of the motor, a gear wheel is mounted, however preferably a worm. At least for the end bearing of the worm or the gear wheel or the output shaft, a plastic bearing is used as a separate bearing location in accordance with the invention. This plastic bearing location offers the advantage that it can be manufactured cost-effectively and, due to its material, it has a damping effect on the drive in combination with the housing.

Plastic housings and in particular plastic housings for technical applications in motor vehicles are preferably manufactured as injection molded components. Components manufactured by thermal injection molding and in particular housings have tolerances which can be particularly disadvantageous if the plastic housings serve directly as bearing locations for drive members and/or the transmission. On the one hand, these tolerances can have a negative effect on the service life and, on the other hand, they can have a negative effect on the noise behavior of the control drive, for example, due to excessive clearance of the transmission components. By using the separate plastic bearing seat, a tolerance compensation can take place according to the invention so that a long service life can be guaranteed and at the same time the noise behavior of the positioning unit can be optimized.

In a design version of the invention, the bearing location is formed from a wear-resistant plastic, in particular polyurethane. Polyurethanes are plastics characterized by high wear resistance and abrasion resistance. At the same time, these plastics offer high strength with adjustable elasticity. Polyurethanes are therefore the preferred choice for use as bearings for drives in positioning units for technical applications in motor vehicles. Combining a high abrasion resistance with adjustable elasticity, the material can be optimally adapted to the requirements of the positioning unit. The degree of hardness can be adjusted in polyurethanes so that the bearing location can be adapted to the forces and/or torque conditions in the drive and thus to the bearing location.

If the bearing location accommodates an output shaft of the drive at least in part, a further design version of the invention is achieved. The positioning unit has an electric drive, preferably a DC motor, which is accommodated in the plastic housing and/or a bearing seat in the plastic housing of the positioning unit. The output shaft can accommodate a worm or gear wheel, which can form the first stage of a downstream transmission. In order to be able to transmit a drive torque or a drive force to the downstream transmission via the output shaft, the output shaft must be guided as accurately as possible in the positioning unit. At an axial end of the output shaft opposite the electric motor, the output shaft can be guided in the plastic bearing location in the housing. On the one hand, the bearing location provides a slide bearing which enables low-noise bearing operation and, on the other hand, by means of the elasticity of the bearing location, clearance compensation can be provided for the drive. The output shaft is inserted into the bearing location at least partly and axially at the end so that an exact positioning of the output shaft in the positioning unit can be guaranteed.

If the bearing location accommodates part of the drive, in particular, one end of the worm drive, a further design version of the invention results. In addition to the possibility of accommodating the output shaft of the motor, the bearing location can also be used to accommodate a control element, such as a worm or a gear wheel of a downstream transmission of the electric motor. Depending on the material of the worm, for example, which can be brass or plastic, the degree of hardness of the bearing location can be adjusted. It is thus possible to optimally adjust the material pairing between the stored part of the drive and the bearing location for a long service life of the positioning unit. The use of a plastic bearing location makes it possible, on the one hand, to adapt easily to the conditions in the housing and, on the other hand, to provide a cost-effective bearing for the part of the drive.

It can also be advantageous and form another design version of the invention if the bearing location forms an axial stop for the part of the drive. Drives and in particular electric motors usually have a clearance between motor and stator, although it is small. This clearance causes the drive members mounted on the output shaft to move axially, as does the output shaft itself. In order to contain and guide this axial clearance, the bearing location may have an axial stop. In an advantageous way, the part of the drive can thus be guided axially, reducing clearance and minimizing noise at the same time. The bearing location thus combines a long service life with low noise emission.

In a further design version, the part of the drive can be guided by means of the bearing location at least in two, preferably three, and even more preferably in four, opposing directions. A part of the drive can be inserted into the bearing location in such a way that the bearing location can be guided in at least two radial directions by means of the bearing location. In an advantageous way, however, the part of the drive is guided in three directions, wherein a guide in the direction of the worm wheel or gear wheel downstream of the part of the drive also forms a guide surface for the part of the drive. In an advantageous way, the part of the drive is thus guided in the bearing location in the side opposite the part of the drive downstream of the gear wheel or worm wheel and in two axes perpendicular to an imaginary line passing between the axes of the part of the drive and the downstream worm wheel or gear wheel of the drive. The bearing location thus forms a bearing location which forms the part of the drive in three plant surfaces arranged at right angles to each other in the bearing location. This means that the part of the drive can be guided in the housing in four directions extending at right angles to each other. On the one hand, the part of the drive is safely accommodated by the downstream transmission and on the other hand by the bearing location in the housing. If the bearing location simultaneously forms an axial stop for the part of the drive, a low-noise and clearance-free drive of the positioning unit can be provided.

If the bearing location can be form-fittingly connected to the housing, the invention can be designed in a variety of ways. By means of a form-fitting accommodation of the bearing location in the housing, easy mounting of the bearing location can be achieved. At the same time, it is possible to provide a positional security for the bearing location by means of form-fitting. It is also possible to simultaneously provide the bearing location with a stop surface so that, for example, a housing cover can be aligned with respect to the bearing location. At the same time, it is possible to fix the bearing location by means of the housing, in particular by means of a housing cover. In addition to the actual bearing of the part of the drive, the bearing location thus has a further function, namely that of providing a stop surface for the housing cover. On the one hand, the housing cover can be aligned with respect to the bearing location and on the other hand, it is possible to fix the bearing location by means of, for example, the housing cover in the housing. The stop surface can thus assume a double function, namely, on the one hand, a positioning of further components of the control drive and on the other hand as a fixing surface to secure the position of the bearing location itself.

A further advantage resulting from the insertion of the bearing location into the housing is that at least one opening in the housing can be closed by means of the bearing location. The insertion of the bearing location into the housing requires an undercut in the housing in some areas. The undercut in the housing can be produced directly by the injection mould assembly itself and a separate slide for the injection mould assembly can be omitted. The bearing location can seal an opening in the housing, providing a simple and cost-effective way to position the invention bearing location securely in the housing.

The bearing location can be inserted into the housing in an advantageous way and in a further design version so that an assembly protection for the bearing location can be achieved. In an advantageous way, the design of the bearing location as a plastic component makes it possible to connect the bearing location with the housing in such a form-fitting manner that a mounting lock or assembly lock can be provided. The bearing location can be designed in such a way that the bearing location can only be inserted into the housing in one alignment. This ensures a safe and always perfect alignment of the bearing location in the housing even in series assembly. The bearing location can thus advantageously fulfill several functions which, in addition to the actual bearing of the part of the drive, enable easy and safe mounting and/or positioning of further components.

In the following, the invention is explained in more detail with reference to the attached drawings using a preferred exemplary embodiment. However, the principle applies that the exemplary embodiment does not restrict the invention, but merely represents an exemplary embodiment of the invention. The features presented may be executed individually or in combination with other features of the description as well as with the claims, individually or in combination.

Figure 2:
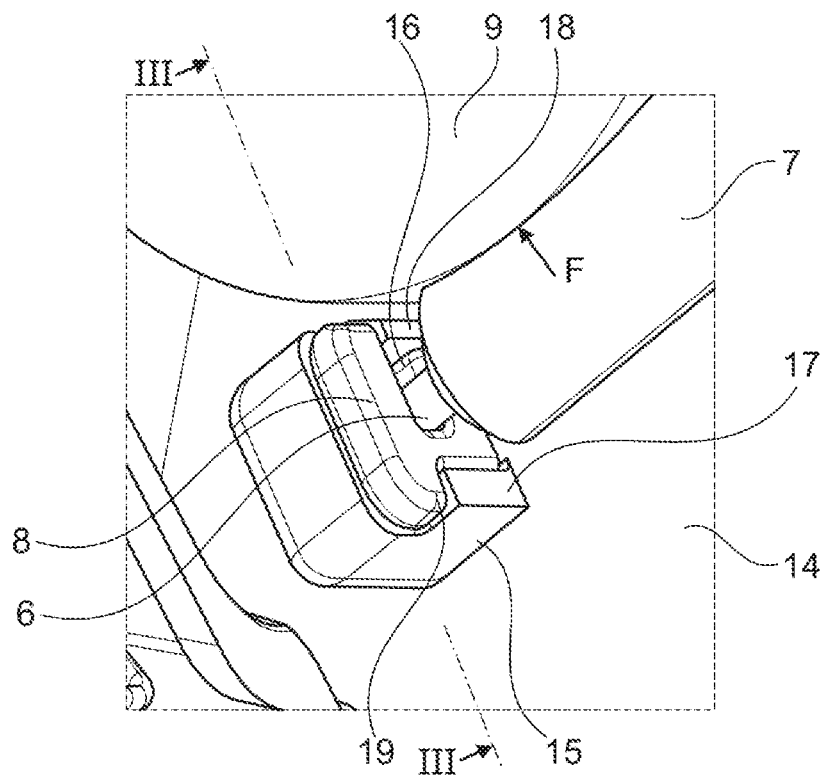
Figure 3:
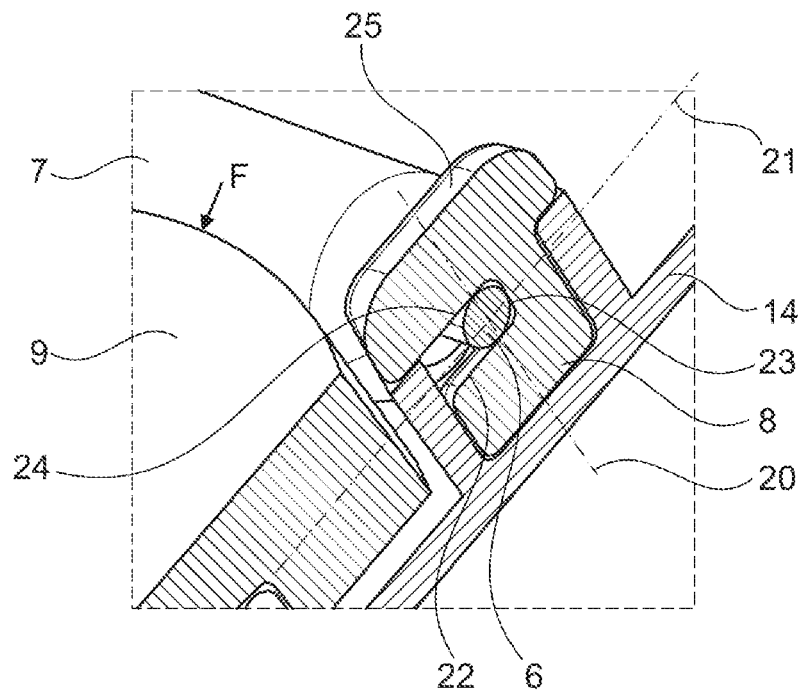
Figure 4:
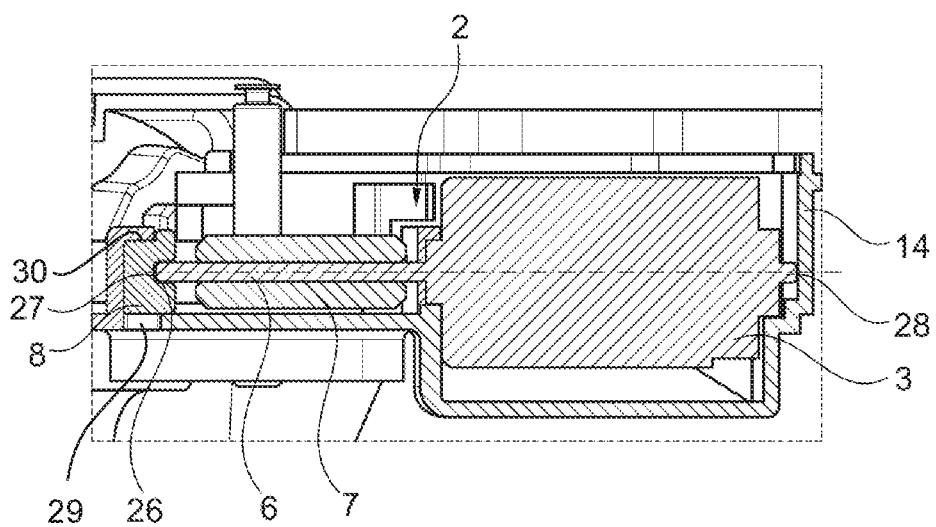

In which:

FIG. 1 shows a three-dimensional view of a part of a control drive with the essential elements for the explanation of the invention, FIG. 2 shows a detailed view of a bearing location which is reproduced form-fittingly accommodated in a housing, FIG. 3 shows a section along line III-III from FIG. 2 through the bearing location, the housing and a downstream transmission member of the part of the drive; and FIG. 4 shows a section through the control drive including the housing according to line IV-IV from FIG. 1.

FIG. 1 shows a three-dimensional view of a positioning unit 1 which is only partly shown. The positioning unit has an electric drive 2 with an electric motor 3 and a downstream worm transmission 4 of the electric motor 3. By means of the worm transmission 4, for example, a downstream cable drum 5 can be driven for a sliding door drive or a Bowden cable. In this exemplary embodiment, a worm is mounted on an output shaft 6 of the electric motor 3. The output shaft 6 extends through the worm 7 into a bearing location 8. The output shaft 6 is inserted into the bearing location 8 and it is guided in three directions extending at right angles to each other by means of the bearing location 8. The worm 7, in turn, engages in a worm wheel 9, wherein the worm wheel 9 interacts with a spiral spring 10, for example, to facilitate and/or enable the worm transmission 4 to be reset. For the sake of clarity of the Figures, the other components, such as electrical contacting for the electric motor 3 via contacts 11, 12, have been omitted. Also shown is a further component 13 of the positioning unit 1, which can for example also be a control medium 13, wherein the control medium 13 can be adjusted by means of the worm transmission 4.

FIG. 2 shows a three-dimensional view of the bearing location of the positioning unit 1, wherein the housing 14 is shown, wherein the housing 14 has an accommodation 15 for the bearing location 8 integrally formed on the housing 14. The output shaft 6 projects beyond an axial extension of the worm 7 and is inserted into a U-shaped opening in the bearing location 8. By means of a resulting force F from the drive 2 and in particular, a resulting force between the worm 7 and the worm wheel 9, the output shaft 6 is securely held in the bearing location 8 and in the U-shaped opening 16. As can be clearly seen in FIG. 2, accommodation 15 has guides 17, 18 for the bearing location, so that the form-fitting can be achieved between the bearing location 8 and housing 14. The guides 17, 18 simultaneously serve to secure the position and allow only a single insertion direction for the bearing location 8 into the housing 14, so that incorrect assembly can be prevented. The bearing location 8 has an undercut 19, which can serve as an assembly protection for the bearing location 8. The worm 7 can, therefore, be safely aligned and guided in the housing 14.

FIG. 3 shows a three-dimensional view of a section along line III-III from FIG. 2 as a section through the housing 14, the bearing location 8 and the worm wheel 9. By means of the resulting force F between worm 7 and worm wheel 9, the output shaft 6 is held in the U-shaped opening 16 of the bearing location 8. The bearing location 8 provides a bearing location for the output shaft which positions the output shaft 6 in three directions at right angles to each other. The orientation of the positioning and in particular the right-angled alignment of the positioning of the output shaft 6 in the bearing location 8 is indicated by the dotted lines. The output shaft 6 is in contact with contact surfaces 22, 23, 24 in the bearing location 8 at bearing location 8. Thus the output shaft 6 can be guided safely and accurately in position in the bearing location 8, whereby a low tolerance, i.e. clearance-free bearing of the output shaft 6 in the housing 14 can be achieved.

At the same time, the bearing location 8 has a stop surface 25, wherein by means of the stop surface a housing part can be positioned, but the bearing location 8 can also be fixed in housing 14. The bearing location 8 can thus guarantee clearance-free bearing of the output shaft 6 and at the same time serve as a contact surface for further components of the positioning unit 1.

FIG. 4 shows a section along the IV-IV line from FIG. 1 as a longitudinal section through the electric motor 3, the worm 7 and the bearing location 8. The section through the drive 2 extends along a central axis M of the electric motor 3 and the output shaft 6. It can clearly be seen that an axial end 26 of the output shaft 6 is inserted into the bearing location 8, wherein the axial end 26 comes into contact with a stop surface 27 of the bearing location 8. By means of the bearing location 8, axial guidance of the output shaft 6 in the positioning unit is also possible. The output shaft 6 can thus be guided on one side with a further axial end 28 in the housing 14 and the bearing location 8 in the positioning unit 1. Thus clearance-free driving of the positioning unit 1 can be guaranteed. A clearance-free driving and a safe positioning of the output shaft 6 as part of the drive ensure low noise emission and, at the same time, a long service life of the positioning unit 1.

A further advantage of the bearing location 8 according to the invention can be clearly seen in FIG. 4. The bearing location 8 closes an opening 29 in the housing 14. The housing 14 forms an undercut 30, whereby the bearing location 8 can be inserted into the undercut 30 so that a more secure positioning of the bearing location 8 is possible. At the same time, the opening 29 is tightly closed. The possibility of forming an undercut 30, in particular a bearing seat, in the housing 14 without having to insert a slide in the injection mould assembly, is another advantage of the invention.

REFERENCE SIGN LIST

1 Positioning unit
2 Drive
3 Electric motor
4 Worm transmission
5 Cable drum
6 Output shaft
7 Worm
8 Bearing location
9 Worm wheel
10 Spiral spring
11, 12 Contacts
13 Control means, component
14 Housing
15 Accommodation
16 U-shaped opening
17, 18 Guide
19 Undercut
20, 21 Lines
22, 23, 24, 27 Contact surfaces
25 Stop surface
26, 28 Axial end
29 Opening
30 Undercut
F Force
M Center axis

The invention claimed is:

1. A positioning unit for a locking system, a door positioner, or a sliding door drive in a motor vehicle, the positioning unit comprising:
   a housing formed of plastic,
   a drive arranged in the housing, wherein the drive is a worm drive,
   a control element which can be acted upon by the drive, and
   a bearing location for the drive which is formed at least partly of plastic, wherein the bearing location is configured as a separate component relative to the drive and at least part of the drive can be inserted into the bearing location;
   wherein the part of the drive can be guided by the bearing location at least in three opposite directions, and the part of the drive includes an output shaft on which a worm of the worm drive is mounted and the three opposite directions extend at right angles to each other.

2. The positioning unit according to claim 1, wherein the bearing location is formed of a wear-resistant plastic.

3. The positioning unit according to claim 2, wherein the bearing location is formed of polyurethane.

4. The positioning unit according to claim 1, wherein the bearing location accommodates an output shaft of the drive at least in part.

5. The positioning unit according to claim 1, wherein the bearing location accommodates a worm of the worm drive.

6. The positioning unit according to claim 1, wherein the bearing location forms an axial stop for the part of the drive.

7. The positioning unit according to claim 1, wherein the bearing location can be form-fittingly connected to the housing.

8. The positioning unit according to claim 1, wherein the housing has guides for inserting the bearing location into the accommodation in the housing.

9. The positioning unit according to claim 8, wherein the guides are configured to enable only a single insertion direction for the bearing location into the housing.

10. The positioning unit according to claim 1, wherein the bearing location can be fixed by the housing.

11. The positioning unit according to claim 1, wherein when the at least part of the drive is inserted into the bearing location, the at least part of the drive is fixed in a position in which the at least part of the drive is orientated at a right angle relative to the bearing location.

12. The positioning unit according to claim 1, wherein the housing has an accommodation portion for the bearing location that is integrally formed on the housing.

13. The positioning unit according to claim 1, wherein the bearing location has an undercut that engages the accommodation portion of the housing.

14. The positioning unit according to claim 1, wherein the housing has an undercut that forms a bearing seat for the bearing location.

15. The positioning unit according to claim 1, wherein the housing has an opening and the bearing location is configured to sealingly close the opening.

* * * * *